United States Patent
Hegde et al.

(10) Patent No.: US 12,511,074 B2
(45) Date of Patent: Dec. 30, 2025

(54) DATA STORAGE DEVICE AND METHOD FOR CLASSIFYING A SET OF CONTINUOUS WORDLINES AS AN OUTLIER BAND IN AN OPEN BLOCK

(71) Applicant: Sandisk Technologies, Inc., Milpitas, CA (US)

(72) Inventors: Pradeep Seetaram Hegde, Uttar Kannada (IN); Darshan Pagariya, Gondia (IN); Akhilesh Yadav, Bangalore (IN); Shivam Mishra, Bangalore (IN); Abhinandan Venugopal, Mysore (IN); Yuvaraj Kumar C.D., Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 23 days.

(21) Appl. No.: 18/735,710

(22) Filed: Jun. 6, 2024

(65) Prior Publication Data
US 2025/0377824 A1    Dec. 11, 2025

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ............................ G06F 3/0604; G06F 3/0679
See application file for complete search history.

(56) References Cited

U.S. PATENT DOCUMENTS

| | | | |
|---|---|---|---|
| 9,747,974 B2 | 8/2017 | Tai et al. | |
| 11,385,802 B2 | 7/2022 | Sharon et al. | |
| 11,709,621 B2 | 7/2023 | Avraham et al. | |
| 2018/0059968 A1* | 3/2018 | Jung | G11C 16/10 |
| 2023/0153003 A1 | 5/2023 | Sheperek et al. | |
| 2023/0326528 A1* | 10/2023 | Sharon | G11C 16/3404 |
| 2023/0402072 A1 | 12/2023 | Bazarsky et al. | |
| 2024/0427500 A1* | 12/2024 | Ciocchini | G06F 3/0679 |

\* cited by examiner

*Primary Examiner* — Nicholas A. Paperno
(74) *Attorney, Agent, or Firm* — Crowell & Moring LLP

(57) ABSTRACT

A data storage device groups a set of continuous wordlines crossing a data retention threshold together as a band. The set of continuous wordlines are in an open block in the memory. The data storage device then determines whether a number of continuous wordlines in the set is greater than a threshold. If the number of continuous wordlines in the set is greater than the threshold, the data storage device classifies the set of continuous wordlines as an outlier band in the open block.

20 Claims, 22 Drawing Sheets

S_CVDT_TTM

| Structure members | Type | Total bytes |
|---|---|---|
| nextFree | U_08 | 1 |
| allocCount | U_08 | 1 |
| rfu | U_16 | 2 |
| activeTrtId[4][3] | U_08*4*3 | 12 |
| gen[D_CVD_TRT_ID_TOTAL_COUNT] | U_32*TRT_ID_TOTAL_COUNT | 128 |
| entries | U_32*TRT_ID_TOTAL_COUNT | 128 |
| Total | | 272 |

| | TRT_ID_TOTAL_COUNT] | 32 |
|---|---|---|
| | D_MAX_DIES_PER_META_DIE | 16 |
| | D_CVD_MAX_NUM_OF_TIERS | 4 |
| | D_CVD_MAX_NUM_VOLT_STATES | 15 |
| | D_CVD_MAX_METABLOCKS_PRE_META_DIE | 3232 |
| | D_MAX_META_DIES | 4 |

S_CVDT_TTP

| Structure members | Type | Total bytes |
|---|---|---|
| S_CVD-READ-PARAMETERS params [D_CVD_TRT_ID_TOTAL_COUNT] [D_CVD_MAX_NUM_OF_TIERS] | (U_08*1+U_08*D_CVD_MAX_NUM_VOLT_STATES)*D_... | 2048 |
| U_08 ber[D_CVD_TRT_ID_TOTAL_COUNT][D_CVD_MAX_NUM_OF_TIERS] | U_08*TRT_ID_TOTAL_COUNT*NUM_OF_TIERS | 128 |
| Total | | 34816 |

MBTT

| Structure members | Type | Size in Bytes |
|---|---|---|
| BBT | U_08*4096 | 3232 |
| Total | | 3232 |

CVDT_FLASH_ONE_META_DIE_TABLES

| Structure members | Type | Total bytes |
|---|---|---|
| ttm | S_CVDT_TTM | 272 |
| ttp[D_MAX_DIES_PER_META_DIE] | S_CVDT_TTP | 34816 |
| bbt[D_CVDT_MBTT_MAX_SIZE] | MBTT | 3232 |
| Total | | 38320 |

| CVD tables size for D_MAX_META_DIES | 153280 |
|---|---|

FIG. 11

| Temperature Region | Active TRT ID |
|---|---|
| 0 | No TRT |
| 1 | TRT 1 |
| 2 | TRT 2 |
| 3 | TRT 3 |

| Temperature Region | Active TRT ID | Data Retention 1 |
|---|---|---|
| 0 | TRT 5 | No TRT |
| 1 | TRT 6 | TRT 1 |
| 2 | No TRT | TRT 2 |
| 3 | TRT 4 | TRT 3 |

| Temperature Region | Active TRT ID | DR2 | DR1+DR2 |
|---|---|---|---|
| 0 | No TRT | TRT 5 | No TRT |
| 1 | TRT7 | TRT 6 | TRT 1 |
| 2 | No TRT | No TRT | TRT 2 |
| 3 | TRT 8 | TRT 4 | TRT 3 |

FIG. 12

| Physical block | | | Meta-block | | | | | | | |
| --- | --- | --- | --- | --- | --- | --- | --- | --- | --- | --- |
| Wordline | String | Page | P0 | | | | P1 | | | |
| 0 | 0 | 0 | 0 | 1 | 2 | 3 | 4 | 5 | 6 | 7 |
| 0 | 0 | 1 | 8 | 9 | 10 | 11 | 12 | 13 | 14 | 15 |
| 0 | 0 | 2 | 16 | 17 | 18 | 19 | 20 | 21 | 22 | 23 |
| 0 | 1 | 0 | 24 | 25 | 26 | 27 | 28 | 29 | 30 | 31 |
| 0 | 1 | 1 | 32 | 33 | 34 | 35 | 36 | 37 | 38 | 39 |
| 0 | 1 | 2 | 40 | 41 | 42 | 43 | 44 | 45 | 46 | 47 |
| 0 | 2 | 0 | 48 | 49 | 50 | 51 | 52 | 53 | 54 | 55 |
| 0 | 2 | 1 | 56 | 57 | 58 | 59 | 60 | 61 | 62 | 63 |
| 0 | 2 | 2 | 64 | 65 | 66 | 67 | 68 | 69 | 70 | 71 |
| 0 | 3 | 0 | 72 | 73 | 74 | 75 | 76 | 77 | 78 | 79 |
| 0 | 3 | 1 | 80 | 81 | 82 | 83 | 84 | 85 | 86 | 87 |
| 0 | 3 | 2 | 88 | 89 | 90 | 91 | 92 | 93 | 94 | 95 |
| 1 | 0 | 0 | 96 | 97 | 98 | 99 | 100 | 101 | 102 | 103 |
| 1 | 0 | 1 | 104 | 105 | 106 | 107 | 108 | 109 | 110 | 111 |
| 1 | 0 | 2 | 112 | 113 | 114 | 115 | 116 | 117 | 118 | 119 |
| 1 | 1 | 0 | 120 | 121 | 122 | 123 | 124 | 125 | 126 | 127 |
| 1 | 1 | 1 | 128 | 129 | 130 | 131 | 132 | 133 | 134 | 135 |
| 1 | 1 | 2 | 136 | 137 | 138 | 139 | 140 | 141 | 142 | 143 |
| 1 | 2 | 0 | 144 | 145 | 146 | 147 | 148 | 149 | 150 | 151 |
| 1 | 2 | 1 | 152 | 153 | 154 | 155 | 156 | 157 | 158 | 159 |
| 1 | 2 | 2 | 160 | 161 | 162 | 163 | 164 | 165 | 166 | 167 |
| 1 | 3 | 0 | 168 | 169 | 170 | 171 | 172 | 173 | 174 | 175 |
| 1 | 3 | 1 | 176 | 177 | 178 | 179 | 180 | 181 | 182 | 183 |
| 1 | 3 | 2 | 184 | 185 | 186 | 187 | 188 | 189 | 190 | 191 |

| | | | | | | | | | | |
| --- | --- | --- | --- | --- | --- | --- | --- | --- | --- | --- |
| N | 0 | 0 | | | | | | | | |
| N | 0 | 1 | | | | | | | | |
| N | 0 | 2 | | | | | | | | |
| N | 1 | 0 | | | | | | | | |
| N | 1 | 1 | | | | | | | | |
| N | 1 | 2 | | | | | | | | |
| N | 2 | 0 | | | | | | | | |
| N | 2 | 1 | | | | | | | | |
| N | 2 | 2 | | | | | | | | |
| N | 3 | 0 | | | | | | | | |
| N | 3 | 1 | | | | | | | | |
| N | 3 | 2 | | | | | | | | |

FIG. 14

S_CVDT_TTM

| Structure members | Type | Total bytes |
|---|---|---|
| nextFree | U_08 | 1 |
| allocCount | U_08 | 1 |
| rfu | U_16 | 2 |
| activeTrtId[4][3] | U_08*4*3 | 12 |
| gen[D_CVD_TRT_ID_TOTAL_COUNT] | U_32*TRT_ID_TOTAL_COUNT | 128 |
| entries | U_32*TRT_ID_TOTAL_COUNT | 128 |
| Total | | 272 |

| | | |
|---|---|---|
| TRT_ID_TOTAL_COUNT] | | 32 |
| D_MAX_DIES_PER_META_DIE | | 16 |
| D_CVD_MAX_NUM_OF_TIERS | | 4 |
| D_CVD_MAX_NUM_PAGES | | 4 |
| D_CVD_MAX_METABLOCKS_PRE_META_DIE | | 3232 |
| D_MAX_META_DIES | | 4 |

S_CVDT_TTP

| Structure members | Type | Total bytes |
|---|---|---|
| S_CVD-READ-PARAMETERS params [D_CVD_TRT_ID_TOTAL_COUNT][D_CVD_MAX_NUM_OF_TIERS] | (U_08*1+U_08*D_CVD_MAX_NUM_PAGES)*D_CVD_MAX_NUM_PAGES)*D_CVD_T | 640 |
| U_08 berf[D_CVD_TRT_ID_TOTAL_COUNT][D_CVD_MAX_NUM_OF_TIERS] | U_08*TRT_ID_TOTAL_COUNT*NUM_OF_TIERS | 128 |
| Total | | 12288 |

MBTT

| Structure members | Type | Size in Bytes |
|---|---|---|
| bbt | U_08*4096 | 3232 |
| Total | | 3232 |

CVDT_FLASH_ONE_META_DIE_TABLES

| Structure members | Type | Total bytes |
|---|---|---|
| ttm[D_MAX_DIES_PER_META_DIE] | S_CVDT_TTM | 272 |
| ttp[D_MAX_DIES_PER_META_DIE] | S_CVDT_TTP | 12288 |
| bbt[D_CVDT_MBTT_MAX_SIZE] | MBTT | 3232 |
| Total | | 15792 |

| | | |
|---|---|---|
| CVD tables size for D_MAX_META_DIES | | 63168 |

FIG. 17

| BiCS5 X3 (1-3-3) | | | | | | | |
|---|---|---|---|---|---|---|---|
| | Er | A | B | C | D | E | F | G |
| UP | 1 | 1 | 0 | 0 | 0 | 1 | 1 | 0 |
| MP | 1 | 0 | 0 | 1 | 1 | 1 | 0 | 0 |
| LP | 1 | 1 | 1 | 1 | 0 | 0 | 0 | 0 |

FIG. 18

| Physical block | | | Meta-block | | | | | | | |
|---|---|---|---|---|---|---|---|---|---|---|
| Wordline | String | Page | P0 | | | | P1 | | | |
| 0 | 0 | 0 | 0 | 1 | 2 | 3 | 4 | 5 | 6 | 7 |
| 0 | 0 | 1 | 8 | 9 | 10 | 11 | 12 | 13 | 14 | 15 |
| 0 | 0 | 2 | 16 | 17 | 18 | 19 | 20 | 21 | 22 | 23 |
| 0 | 1 | 0 | 24 | 25 | 26 | 27 | 28 | 29 | 30 | 31 |
| 0 | 1 | 1 | 32 | 33 | 34 | 35 | 36 | 37 | 38 | 39 |
| 0 | 1 | 2 | 40 | 41 | 42 | 43 | 44 | 45 | 46 | 47 |
| 0 | 2 | 0 | 48 | 49 | 50 | 51 | 52 | 53 | 54 | 55 |
| 0 | 2 | 1 | 56 | 57 | 58 | 59 | 60 | 61 | 62 | 63 |
| 0 | 2 | 2 | 64 | 65 | 66 | 67 | 68 | 69 | 70 | 71 |
| 0 | 3 | 0 | 72 | 73 | 74 | 75 | 76 | 77 | 78 | 79 |
| 0 | 3 | 1 | 80 | 81 | 82 | 83 | 84 | 85 | 86 | 87 |
| 0 | 3 | 2 | 88 | 89 | 90 | 91 | 92 | 93 | 94 | 95 |
| 1 | 0 | 0 | 96 | 97 | 98 | 99 | 100 | 101 | 102 | 103 |
| 1 | 0 | 1 | 104 | 105 | 106 | 107 | 108 | 109 | 110 | 111 |
| 1 | 0 | 2 | 112 | 113 | 114 | 115 | 116 | 117 | 118 | 119 |
| 1 | 1 | 0 | 120 | 121 | 122 | 123 | 124 | 125 | 126 | 127 |
| 1 | 1 | 1 | 128 | 129 | 130 | 131 | 132 | 133 | 134 | 135 |
| 1 | 1 | 2 | 136 | 137 | 138 | 139 | 140 | 141 | 142 | 143 |
| 1 | 2 | 0 | 144 | 145 | 146 | 147 | 148 | 149 | 150 | 151 |
| 1 | 2 | 1 | 152 | 153 | 154 | 155 | 156 | 157 | 158 | 159 |
| 1 | 2 | 2 | 160 | 161 | 162 | 163 | 164 | 165 | 166 | 167 |
| 1 | 3 | 0 | 168 | 169 | 170 | 171 | 172 | 173 | 174 | 175 |
| 1 | 3 | 1 | 176 | 177 | 178 | 179 | 180 | 181 | 182 | 183 |
| 1 | 3 | 2 | 184 | 185 | 186 | 187 | 188 | 189 | 190 | 191 |

| | | | | | | | | | | |
|---|---|---|---|---|---|---|---|---|---|---|
| N | 0 | 0 | | | | | | | | |
| N | 0 | 1 | | | | | | | | |
| N | 0 | 2 | | | | | | | | |
| N | 1 | 0 | | | | | | | | |
| N | 1 | 1 | | | | | | | | |
| N | 1 | 2 | | | | | | | | |
| N | 2 | 0 | | | | | | | | |
| N | 2 | 1 | | | | | | | | |
| N | 2 | 2 | | | | | | | | |
| N | 3 | 0 | | | | | | | | |
| N | 3 | 1 | | | | | | | | |
| N | 3 | 2 | | | | | | | | |

FIG. 20

| Physical block | | | Meta-block | | | | | | | |
|---|---|---|---|---|---|---|---|---|---|---|
| Wordline | String | Page | P0 | | | | P1 | | | |
| 0 | 0 | 0 | 0 | 1 | 2 | 3 | 4 | 5 | 6 | 7 |
| 0 | 0 | 1 | 8 | 9 | 10 | 11 | 12 | 13 | 14 | 15 |
| 0 | 0 | 2 | 16 | 17 | 18 | 19 | 20 | 21 | 22 | 23 |
| 0 | 1 | 3 | 24 | 25 | 26 | 27 | 28 | 29 | 30 | 31 |
| 0 | 1 | 4 | 32 | 33 | 34 | 35 | 36 | 37 | 38 | 39 |
| 0 | 1 | 5 | 40 | 41 | 42 | 43 | 44 | 45 | 46 | 47 |
| 0 | 2 | 6 | 48 | 49 | 50 | 51 | 52 | 53 | 54 | 55 |
| 0 | 2 | 7 | 56 | 57 | 58 | 59 | 60 | 61 | 62 | 63 |
| 0 | 2 | 8 | 64 | 65 | 66 | 67 | 68 | 69 | 70 | 71 |
| 0 | 3 | 9 | 72 | 73 | 74 | 75 | 76 | 77 | 78 | 79 |
| 0 | 3 | 10 | 80 | 81 | 82 | 83 | 84 | 85 | 86 | 87 |
| 0 | 3 | 11 | 88 | 89 | 90 | 91 | 92 | 93 | 94 | 95 |

FIG. 21

| Physical block | | | Meta-block | | | | | | | |
|---|---|---|---|---|---|---|---|---|---|---|
| Wordline | String | Page | P0 | | | | P1 | | | |
| 0 | 0 | 0 | 0 | 1 | 2 | 3 | 4 | 5 | 6 | 7 |
| 0 | 0 | 1 | 8 | 9 | 10 | 11 | 12 | 13 | 14 | 15 |
| 0 | 0 | 2 | 16 | 17 | 18 | 19 | 20 | 21 | 22 | 23 |
| 0 | 1 | 3 | 24 | 25 | 26 | 27 | 28 | 29 | 30 | 31 |
| 0 | 1 | 4 | 32 | 33 | 34 | 35 | 36 | 37 | 38 | 39 |
| 0 | 1 | 5 | 40 | 41 | 42 | 43 | 44 | 45 | 46 | 47 |
| 0 | 2 | 6 | 48 | 49 | 50 | 51 | 52 | 53 | 54 | 55 |
| 0 | 2 | 7 | 56 | 57 | 58 | 59 | 60 | 61 | 62 | 63 |
| 0 | 2 | 8 | 64 | 65 | 66 | 67 | 68 | 69 | 70 | 71 |
| 0 | 3 | 9 | 72 | 73 | 74 | 75 | 76 | 77 | 78 | 79 |
| 0 | 3 | 10 | 80 | 81 | 82 | 83 | 84 | 85 | 86 | 87 |
| 0 | 3 | 11 | 88 | 89 | 90 | 91 | 92 | 93 | 94 | 95 |

FIG. 22

DATA STORAGE DEVICE AND METHOD FOR CLASSIFYING A SET OF CONTINUOUS WORDLINES AS AN OUTLIER BAND IN AN OPEN BLOCK

BACKGROUND

A data storage device can use an algorithm to detect and correct a read voltage shift in a closed block of memory, which can be beneficial in data retention and in providing a certain level of the data immunity in case of temperature changes. Data retention handling can be done by keeping a digital-to-analog conversion (DAC) table and updating it periodically based on memory characterization and data retention handling recommendations.

BRIEF DESCRIPTION OF THE DRAWINGS

FIG. 11 is a table of an embodiment showing usage of volatile memory to store tables.

FIG. 12 is a table of an embodiments showing multiple allocations.

FIG. 14 is a table of an embodiment specifying physical blocks and metablocks.

FIG. 17 is a table illustrating an advantage of an embodiment.

FIG. 18 is an illustration of an encoding format of an embodiment.

FIG. 20 is a table of an embodiment specifying physical blocks and metablocks.

FIG. 21 is a table of an embodiment specifying physical blocks and metablocks.

FIG. 22 is a table of an embodiment specifying physical blocks and metablocks.

DETAILED DESCRIPTION

The following embodiments generally relate to a data storage device and method for open block data retention detection for multiple meta dies. In one embodiment, a data storage device is provided comprising a memory and one or more processors. The one or more processors, individually or in combination, are configured to: group a set of continuous wordlines crossing a data retention threshold together as a band, wherein the set of continuous wordlines are in an open block in the memory; determine whether a number of continuous wordlines in the set is greater than a threshold; and in response to determining that the number of continuous wordlines in the set is greater than the threshold, classify the set of continuous wordlines as an outlier band in the open block.

In another embodiment, a method is provided that is performed in a data storage device comprising a memory. The method comprises: grouping a set of continuous wordlines crossing a data retention threshold together as a band, wherein the set of continuous wordlines are in an open block in the memory; determining whether a number of continuous wordlines in the set is greater than a threshold; and in response to determining that the number of continuous wordlines in the set is greater than the threshold, classifying the set of continuous wordlines as an outlier band in the open block.

In yet another embodiment, a data storage device is provided comprising: a memory; and means for: grouping a set of continuous wordlines crossing a data retention threshold together as a band, wherein the set of continuous wordlines are in an open block in the memory; determining whether a number of continuous wordlines in the set is greater than a threshold; and in response to determining that the number of continuous wordlines in the set is greater than the threshold, classifying the set of continuous wordlines as an outlier band in the open block.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
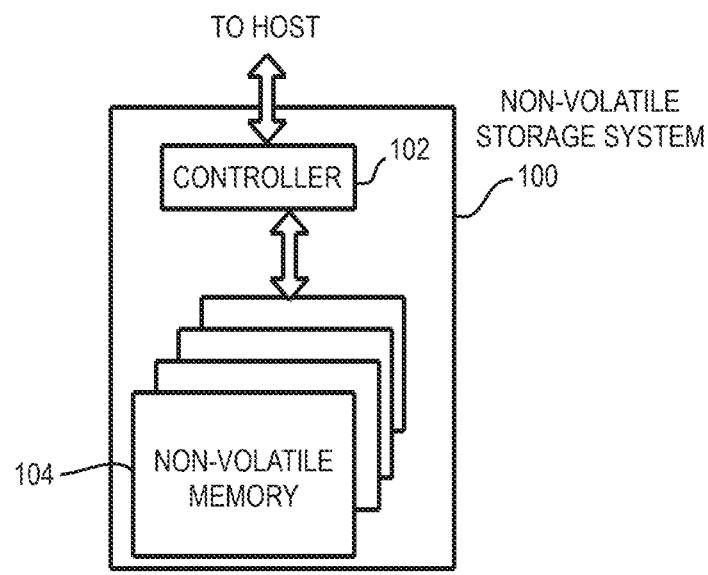
FIG. 1A is a block diagram of a data storage device of an embodiment.
Figure 1B:
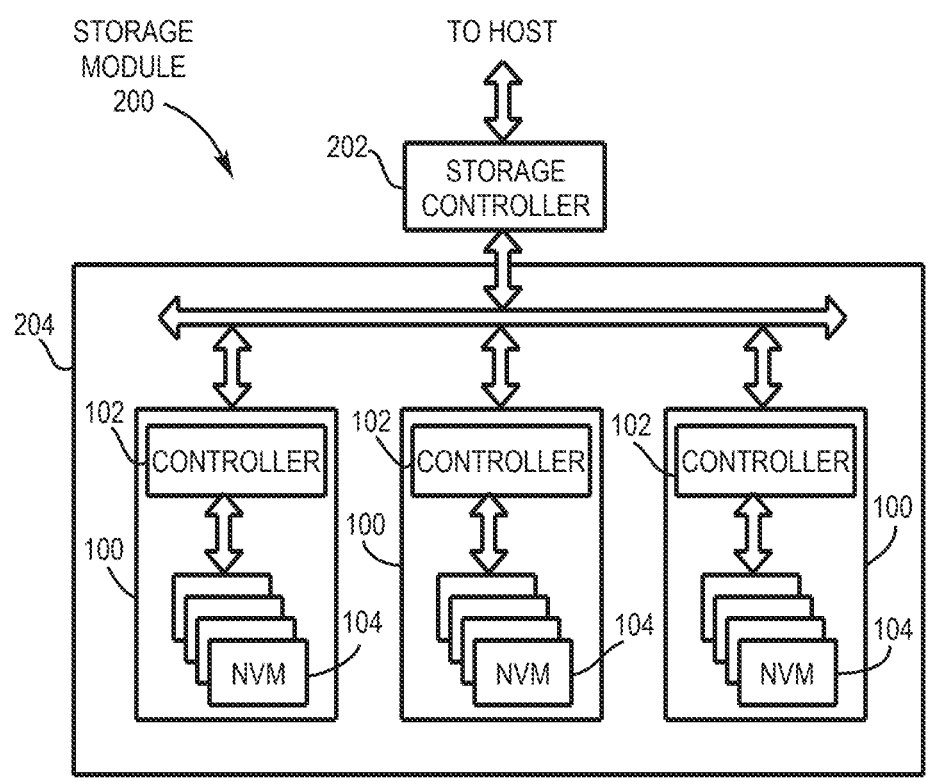
FIG. 1B is a block diagram illustrating a storage module of an embodiment.
Figure 1C:
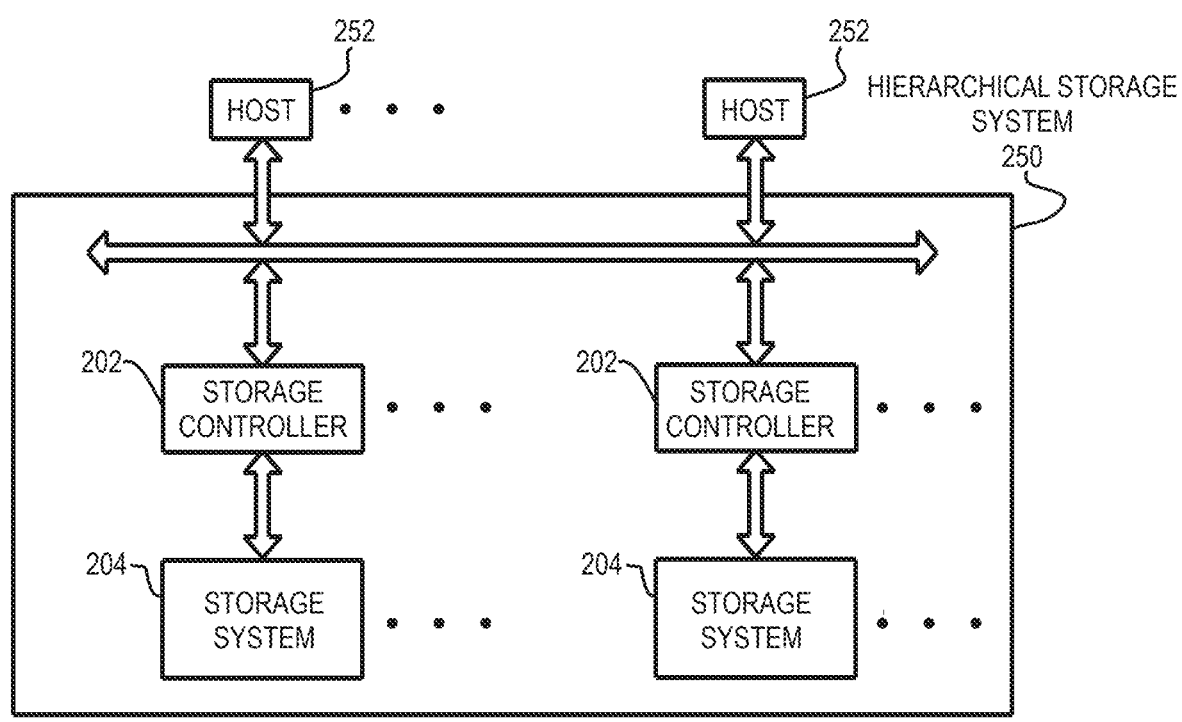
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
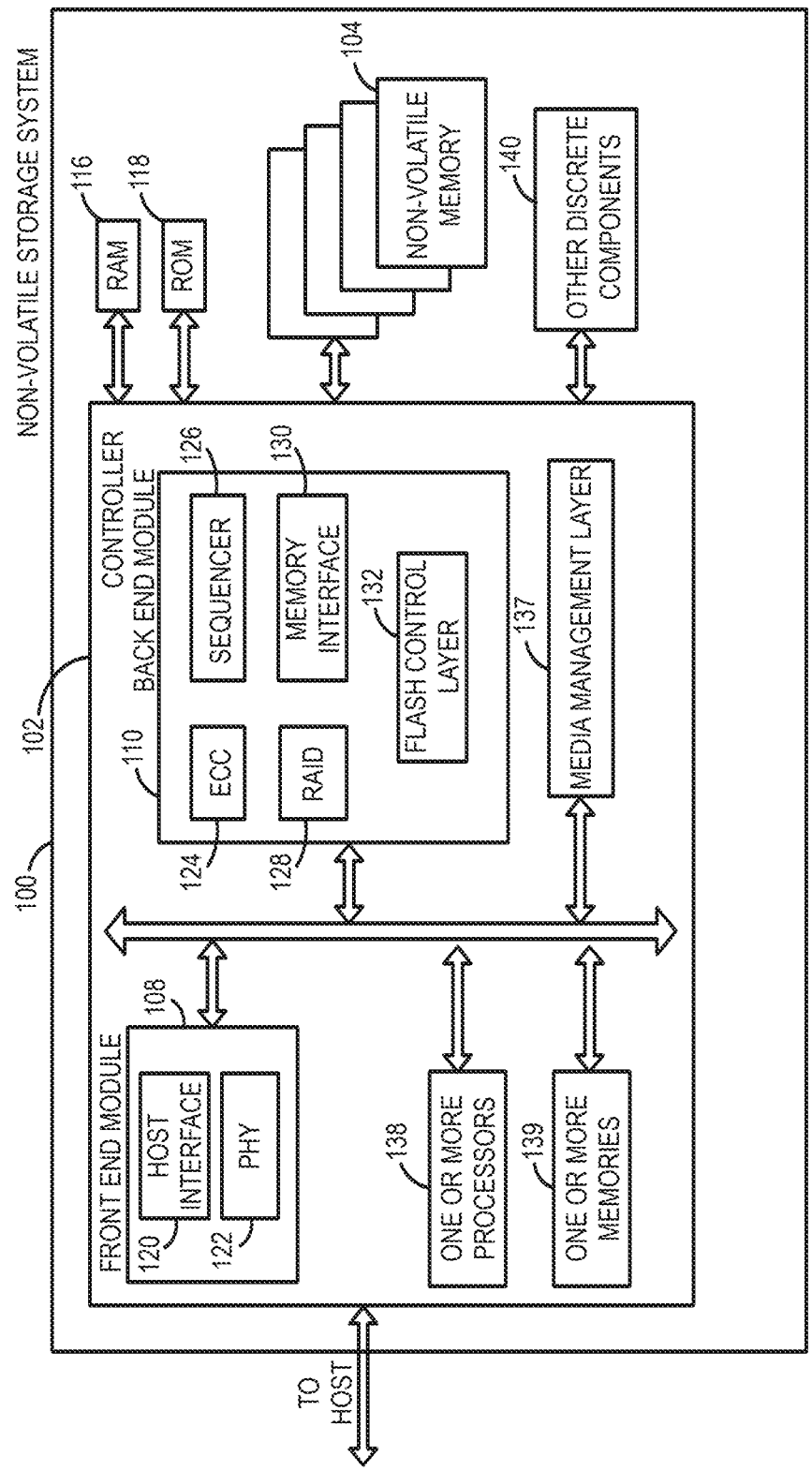
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
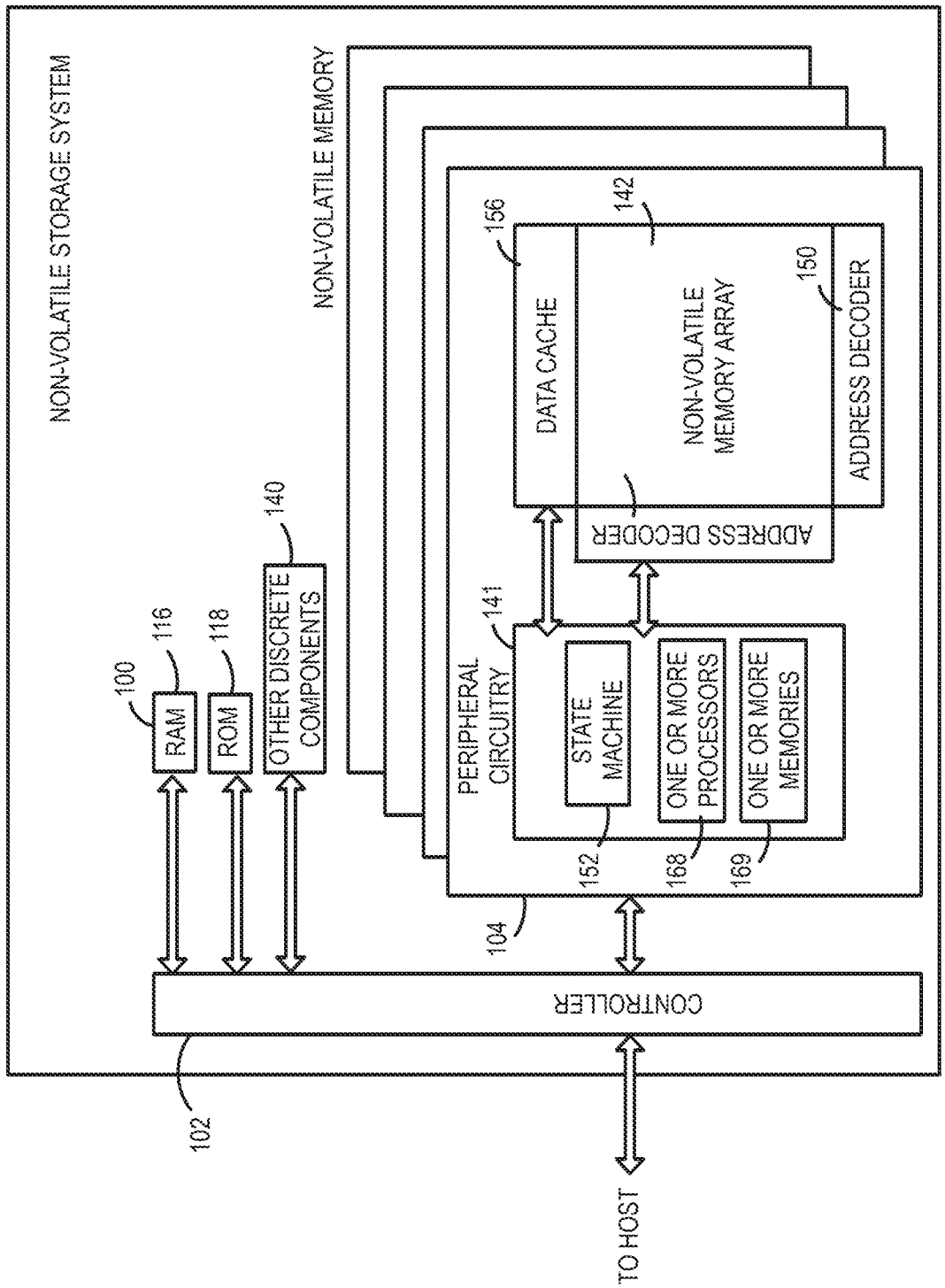
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
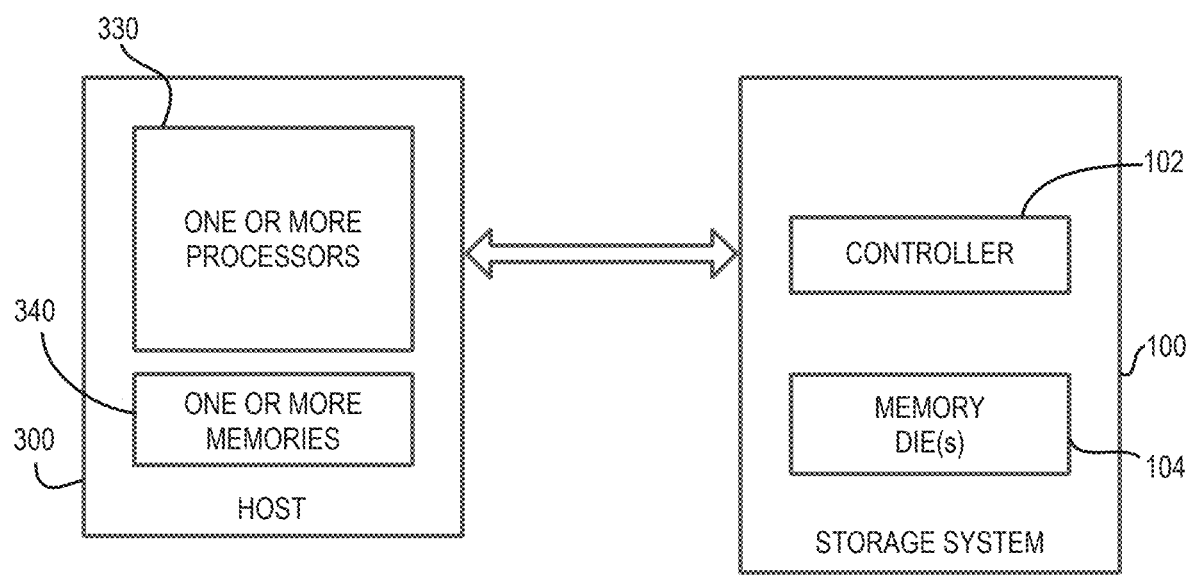
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

There are many methods and algorithms to detect and correct the read voltage shift in closed block BiCS NAND memories, which helps in reading user data after a long time (data retention) and in providing a certain level of the data immunity in case of cross-temperature changes. Data retention handling can be done by keeping a digital-to-analog conversion (DAC) table and updating it periodically based on memory characterization and data retention handling recommendations.

User/host data in physical blocks of memory need to be refreshed periodically in order to keep in the data under a readable limit (before an uncorrectable error is encountered). Such refreshing can be done by using previous DAC values. However, when a physical block is partially programmed, it can be difficult to guaranty data readability after some time. While algorithms can be used to correct voltage shifts that can occur due to temperature and aging, there is currently no method to detect the shift in the voltage early enough so that the shifts can be adjusted before the host reads the data (on demand) for open or partially-programmed blocks.

With technological advancement in the BiCS memories, block size will keep growing. As such, adjustments may be needed to the way firmware handles the memory blocks. For example, a metablock can be accessed as a metapage in order to group similar wordlines across all the dies for parallel operations. Also, a large-capacity block can limit the block budget, and losing even one block can be a huge loss of user data (e.g., gigabytes of partially-written data can become non-recoverable).

There are other side effects of the open block data retention issue. For example, there can be significant number of the open blocks in a data storage device (e.g., >8 in case of multi-meta die architecture of a higher capacity solid-state drive (SSD)). If firmware attempts to perform an enhanced post-write read (EPWR) or read scrub operation on an open block where data retention issues have occurred, the operation can fail with a high bit error rate (BER) and cause a severe reduction in host read performance due to run time handling of the high BER blocks along with host operations, which can generate a greater number of grown bad blocks. These affected open blocks can be relocated as soon as the data retention issue is detected.

The following embodiments provide a new open metablock data retention detection method in a multi meta die environment. As used herein, a meta die can refer to a sub-set of memory dies that can operate in parallel. In some situations, a meta die is the maximum number of memory dies that can operate in parallel. A data storage device can have multiple meta dies. Each meta die can be treated as an independent sub-system having its own group allocation table (GAT) blocks (with logical-to-physical address maps), host blocks, relocation blocks, etc. Blocks of memory across various memory dies are referred to herein as meta-blocks.

Figure 4:
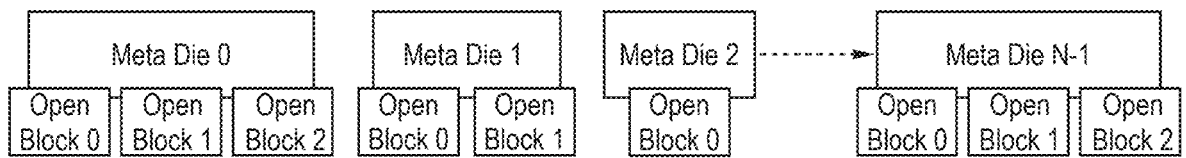
FIG. 4 is an illustration of a plurality of meta dies of an embodiment.

In a multi meta die environment, a plurality of meta dies (e.g., 8 TB capacity memory meta dies) can be accessed for write operation in sequential order, in a round robin manner, or in a priority thread based on the application. This can lead to a greater number of open blocks in the memory. Turning again to the drawings, FIG. 4 is an illustration of a pluraity of meta dies of an embodiment. As shown in FIG. 4, there can be too many open blocks in the system, and, under different temperature conditions, the open blocks can experience different amount of data retention over the time.

Figure 5:
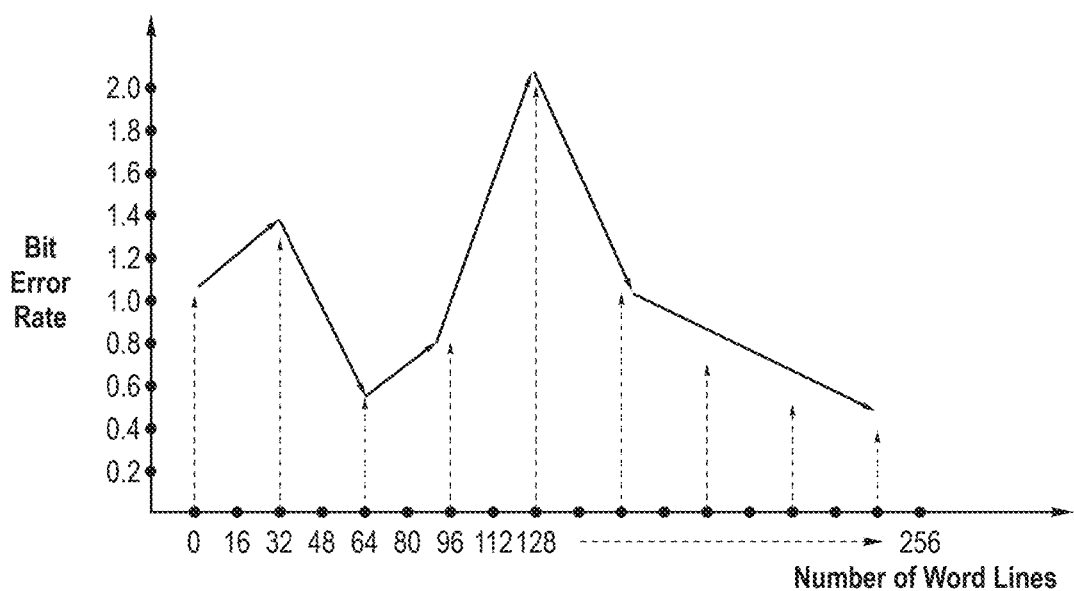
FIG. 5 is a graph of an embodiment of bit error rate versus number of wordlines.

In BICS8 memory onwards, block wordline layers can increase to more than 256, and some of the firmware internal control data open blocks and host data written open blocks can experience different types of cell voltage distribution (CVD) shifts. Based on various conditions, these shifts can be difficult to track and compare with closed metablocks. For example, one such condition is an uneven temperature change when an open block is opened for a long time. Due to multiple changes in temperature and transitions back to a previous temperature, a region in an open block can experience different amount of BER in different programmed wordlines in the block. FIG. 5 is a graph of an embodiment of bit error rate versus number of wordlines.

Figure 6:
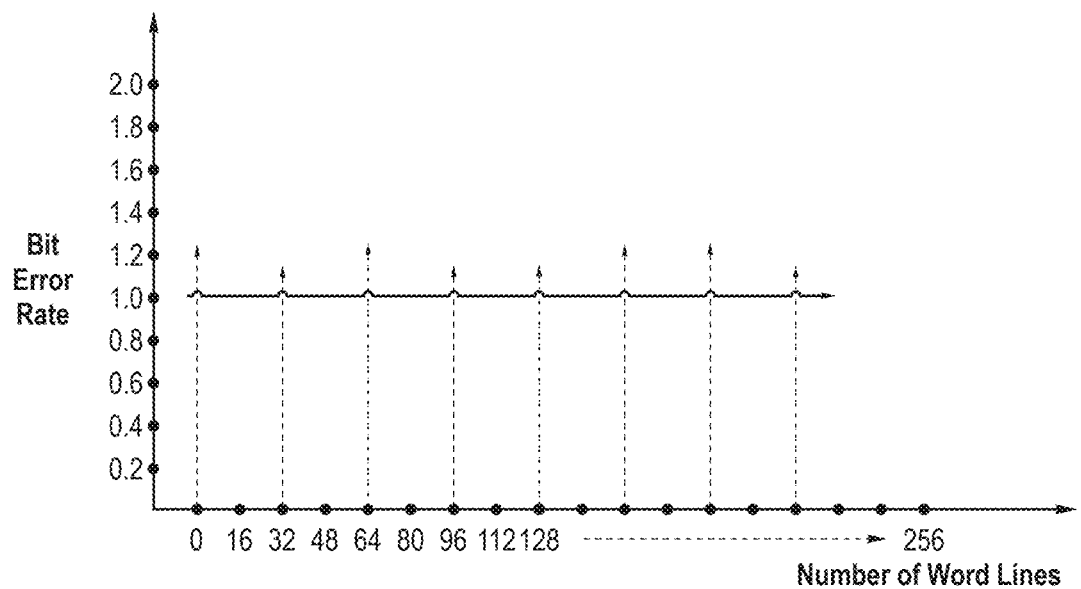
FIG. 6 is a graph of an embodiment of bit error rate versus number of wordlines.
Figure 7:
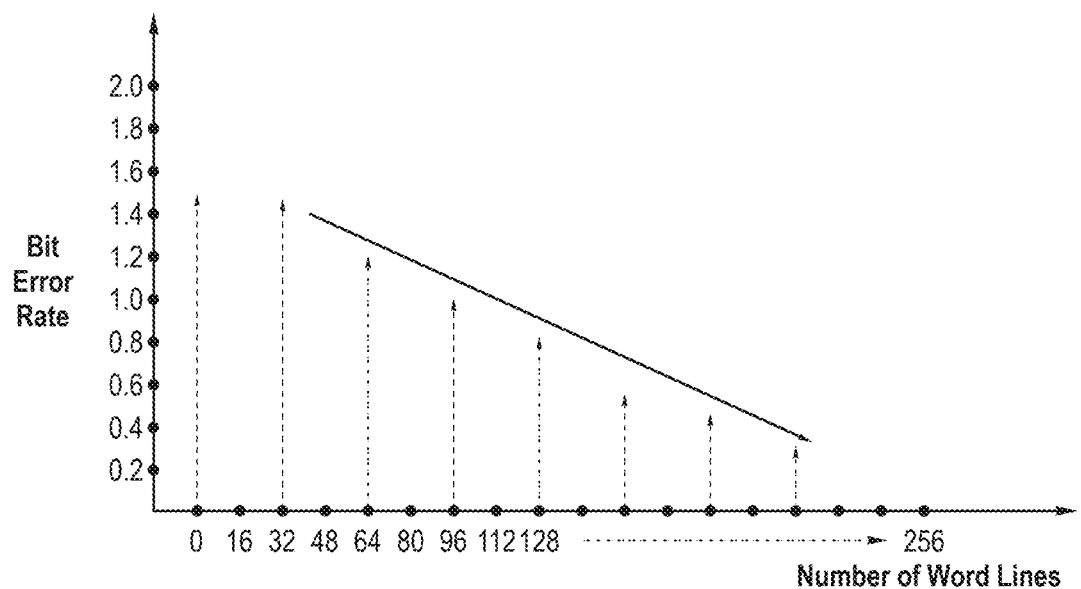
FIG. 7 is a graph of an embodiment of bit error rate versus number of wordlines.

As another example, room temperature data retention (RTDR) and low temperature data retention (LTDR) can have high BER effect on a previously-programmed wordline in an open block, and there can be mix of RTDR and LTDR effects that can lead to different amount of BER on different group of wordlines, as shown in FIG. 6. Yet another example is outlier open metablocks with only initial wordlines that are affected with RTDR. This is a common phenomena where only some of the initial wordlines are affected by RTDR. FIG. 7 shows that initial wordlines programmed 7-8 week back experiance RTDR effect, where other recently-programmed wordlines doe not have any data retention effects.

In one embodiment, the controller 102 of the data storage device 100 can perform early prediction of an indicative wordlines' BER region crossing using a second derivative approach. In general, the data retention (DR) phenomena is very slow, and RTDR or open block DR (OBDR) adds another complexity to detect DR early enough to correct the effected block(s). In this embodiment, the second derivative method can help in detecting the DR shifts early enough based on the proposed BER region crossing for the indicative wordlines and be corrected. Based on the amount of wordlines programmed in an open block, the inndicative wordlines can be: 0, 16, 32, 55, 56, 64, . . . 127, 128, . . . 255. The BER value can be checked for open block DR detection.

Figure 8:
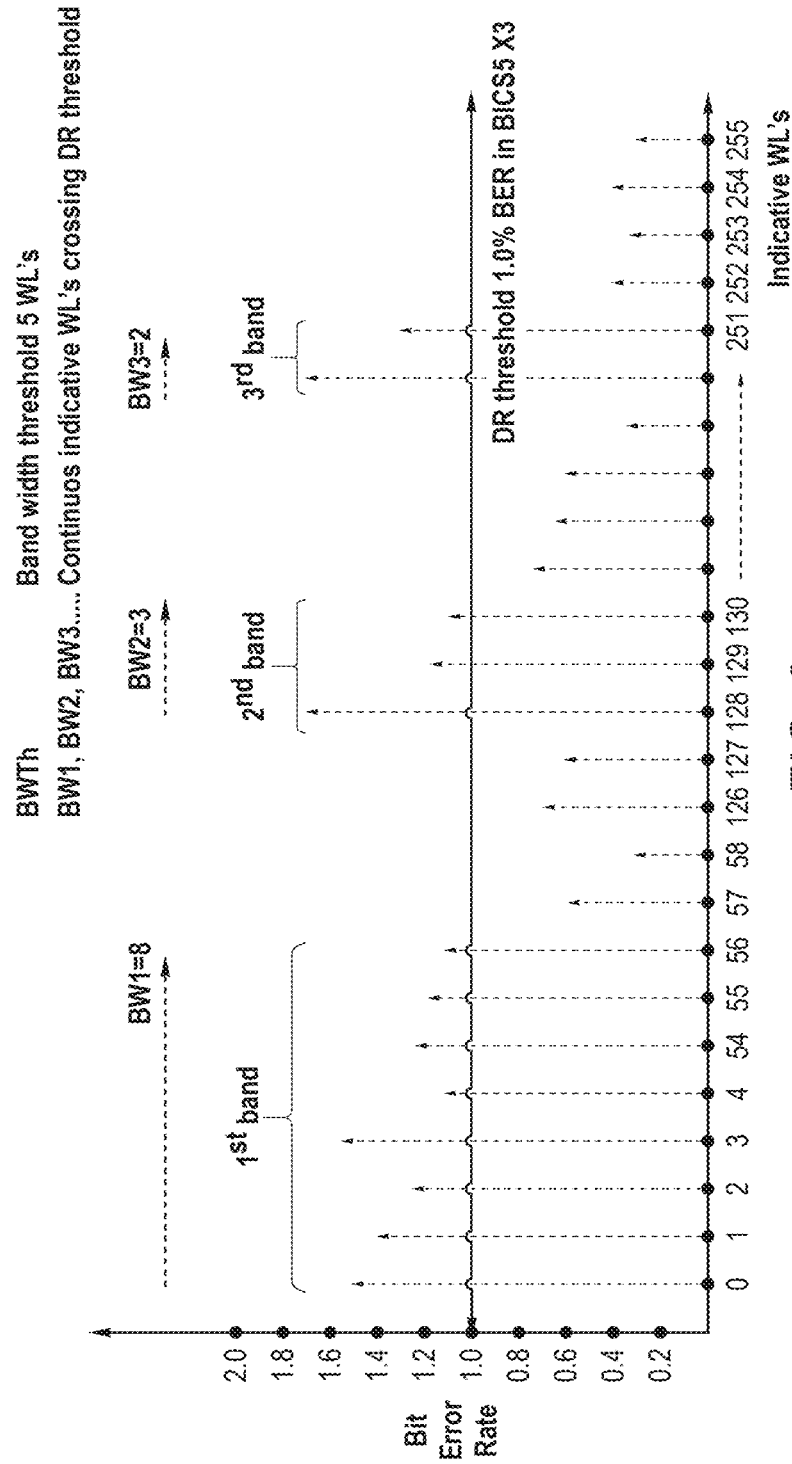
FIG. 8 is a graph of an embodiment of bit error rate versus number of wordlines.

The controller 102 can group the continuous indicative wordlines crossing the DR threshold using the second derivative approach and make organize them as bands. If the number of continuous indicative wordlines the DR BER threshold is greater than BWTh (bandwidth threshold), the open block band can be considered as an outlier band in the open block. The outlier band number of wordlines that are DR effected can be determined by using two steps. In the first step, the controller 102 performs a coarse DR detection on set of indicative wordlines. The coarse BER estimation is on BICS memory defined indicative wordline. Edge wordlines or joint wordlines can show a faster change in high BER compared to other good wordlines in the memory 104. FIG. 8 is a graph that illustrates this. In the second step, the controller 102 performs fine DR detection on neighboring wordlines of outlier bands in an open block. Fine DR detection is one more granular level DR detection to check whether neighboring wordlines are DR affected or not. FIG. 8 is a graph illustrating using neighboring wordlines BER estimation to detect an actual width of an outlier band. In summary, an indicative wordline scan for open block DR detection can be dependent on the memory behavior and characteristics, and using coarse and fine operations can be the most efficient way for uneven DR-effected open blocks.

Figure 9:
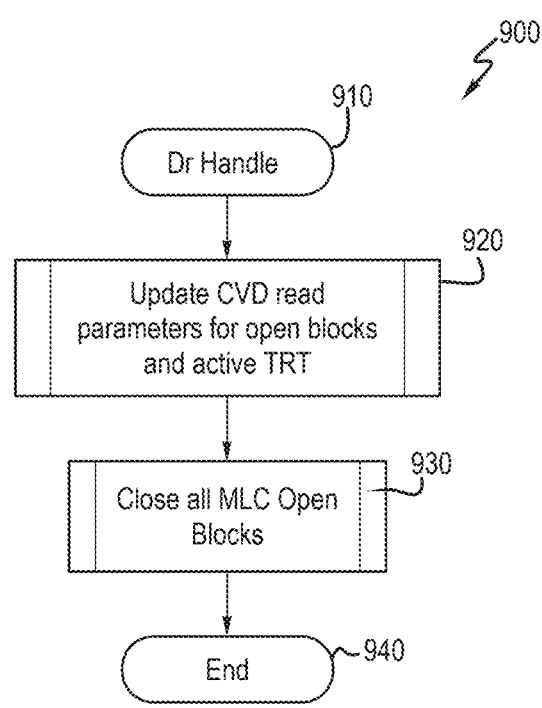
FIG. 9 is a flow chart of a method of an embodiment for open block data retention handling.

FIG. 9 is a flow chart 900 of a method of an embodiment for open block data retention handling. As shown in FIG. 9, in this method, the controller 102 begins the DR handling process (910) by updating the CVD read parameters for open blocks and active thermal region tags (TRT) (920). The controller 102 then closes close DR-detected open MLC block so blocks will be assigned to active TRT (930), after which the method ends (940).

This DR detection idea can be extended to predict the amount of DRs across multiple open blocks based on the information on what kind of DR phenomena is affected on open block memory. Usually, the RTDR effect is on all the wordlines in the block, and uneven or variable temperature change DR effects are on a certain band of wordlines, where the RTDR effects are on only some of the previously-programmed wordlines.

There are several advantages associated with these embodiments. For example, open block DR detection can important in the mount path, as it can prevent further read failures in the device (there can be control open blocks like MST, MTM, and GAT open blocks where DR detection is critical in the mount path). These embodiments can also prevent unnecessary random read scrub scan failures on an open block, and RTDR-related failures can be directly addressed based on the data collected. These embodiments can also provide improved read performance (the controller 102 can have the best read parameter for each wordline zone based on data), improved relocation (the optimal read parameter based on wordline zone can reduce the program-erase count of a block), and reduced TRT compaction. Further, this DR detection solution can help detect and identify the effect of multiple temperature region changes on open blocks and can be a good fit for non-sub-block-mode memory. Additionally, these embodiments can help improve sequential read performance.

Figure 10:
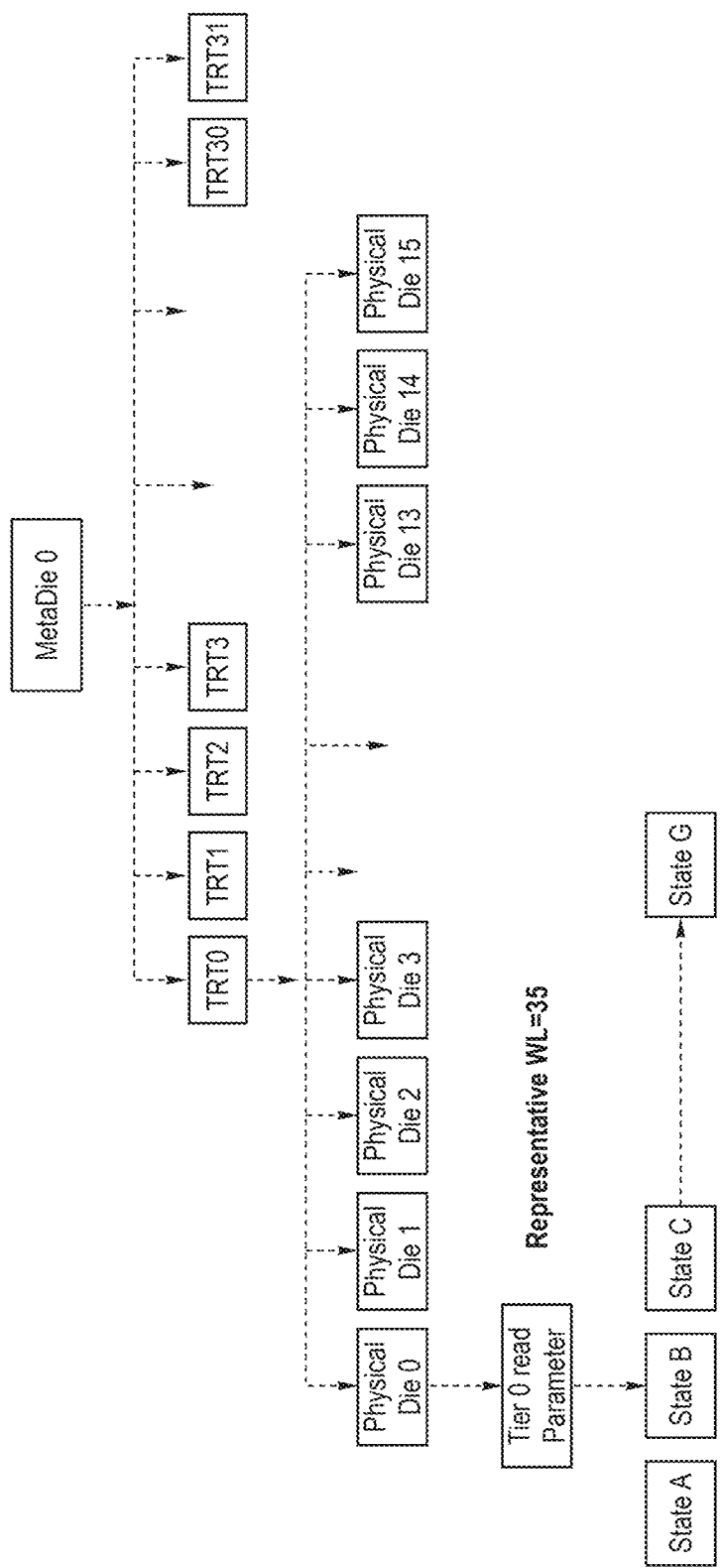
FIG. 10 is a diagram of a tracking method of an embodiment.

Another embodiment relates to page die scope cell voltage distribution (CVD) time tags. There is a need to reduce the system overhead caused by frequent temperature change and the RTDR effect on specific pages, and as well as consuming of other system resources each time the system detects an RTDR issue. This is especially true for TLC/QLC/PLC blocks with high sensitivity to the RTDR effect. Previous CVD tracking approaches maintain CVD read parameters based on CVD states for TLC memory. The amount of RAM and NAND space consumed is less because TLC memory has only seven states. FIG. 10 is a diagram that explain a CVD tracking method of maintaining CVD read parameters with respect to each stage.

Figure 13:
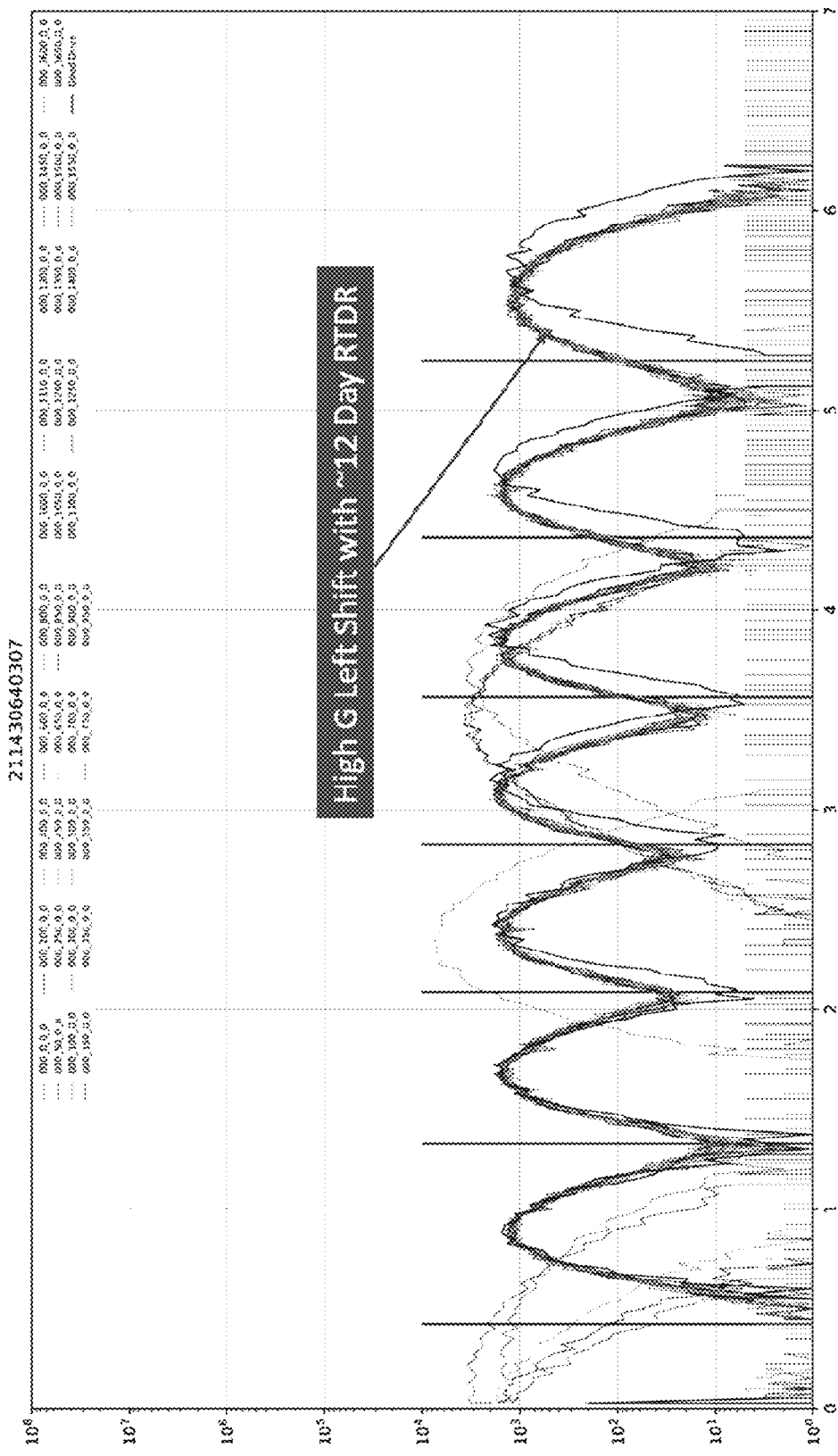
FIG. 13 is a graph of an embodiment showing a room temperature data retention shift in an upper page.

As shown in FIG. 11, for certain types of memory, the total amount of CVD tables can be been increased to 150K, which requires a large amount of RAM. Also, as shown in FIG. 12, multiple TRT allocation in a system can happen after DR detection, where active TRTs in all temperature regions are invalidated or moved to the background and new TRTs are allocated. Data retention detection has been observed in BICS5 X3 512 Gb memory, where data retention shifts effects are mostly in the upper page, which can lead to LDPC decode failure. During read error handling, the TRT update path LDPC BES operation can be done on only one specific logical page—either lower, middle, upper or top page. FIG. 13 is a graph shows an RTDR shift only on an upper page.

Figure 16:
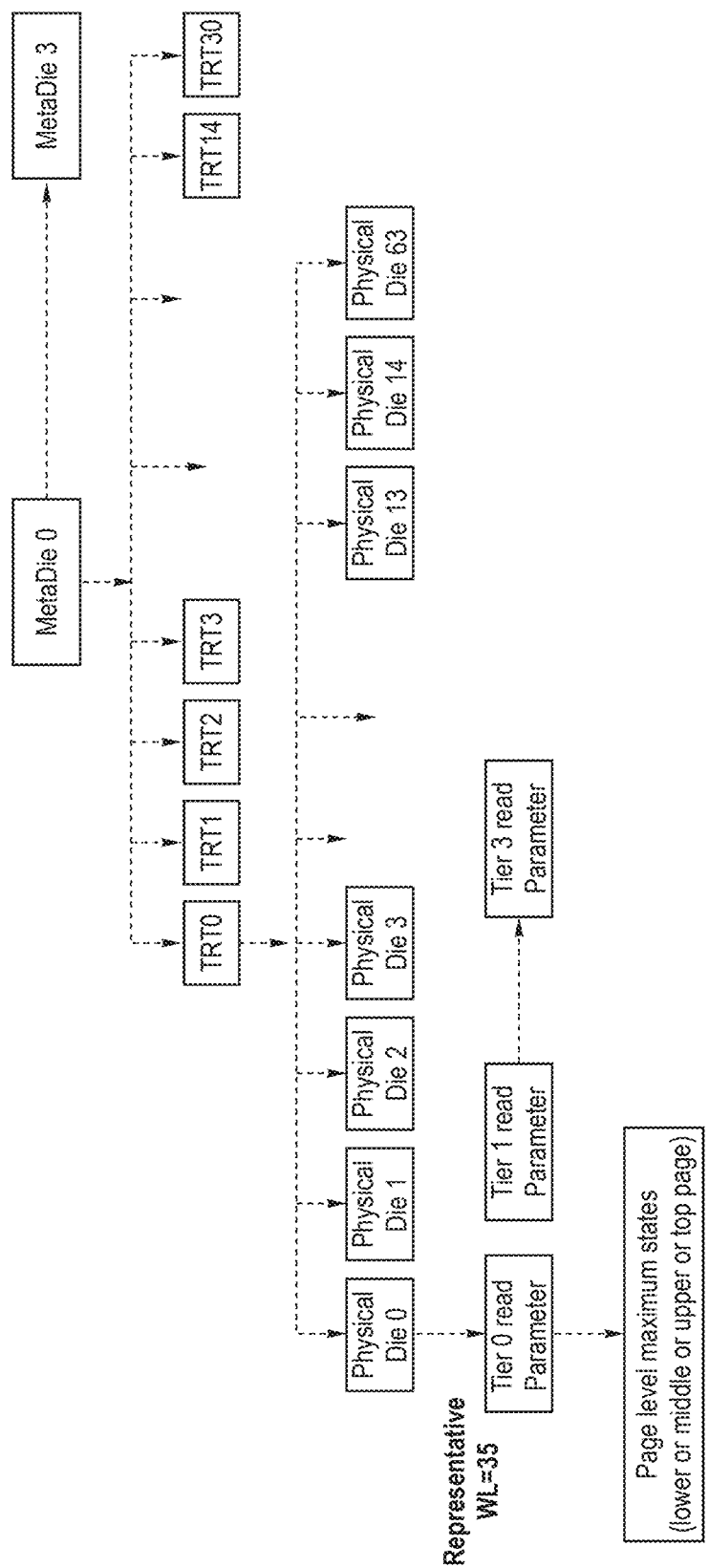
FIG. 16 is a block diagram of an embodiment illustrating the use of logical page level data retention bit error rate region tags.

In the following embodiments (see FIG. 16), the controller 102 uses logical page scope specific CVD data retention BER Region tags, and a CVD module maintains the CVD read parameters on a logical page level using CVD states. These embodiments can address the situation in which RTDR and SSD like memory are operated between 0 and 90 C where there is more of a shift in the CVD distribution in upper and top pages as compared to lower and middle pages. These embodiments can help page level scope read parameters by maintaining CVD read parameters for all the 15 states in case of QLC memory. Also, with these embodiments, the amount of space to maintain the thermal region tags can be reduced by 50%, as illustrated in the table in FIG. 17.

Figure 15:
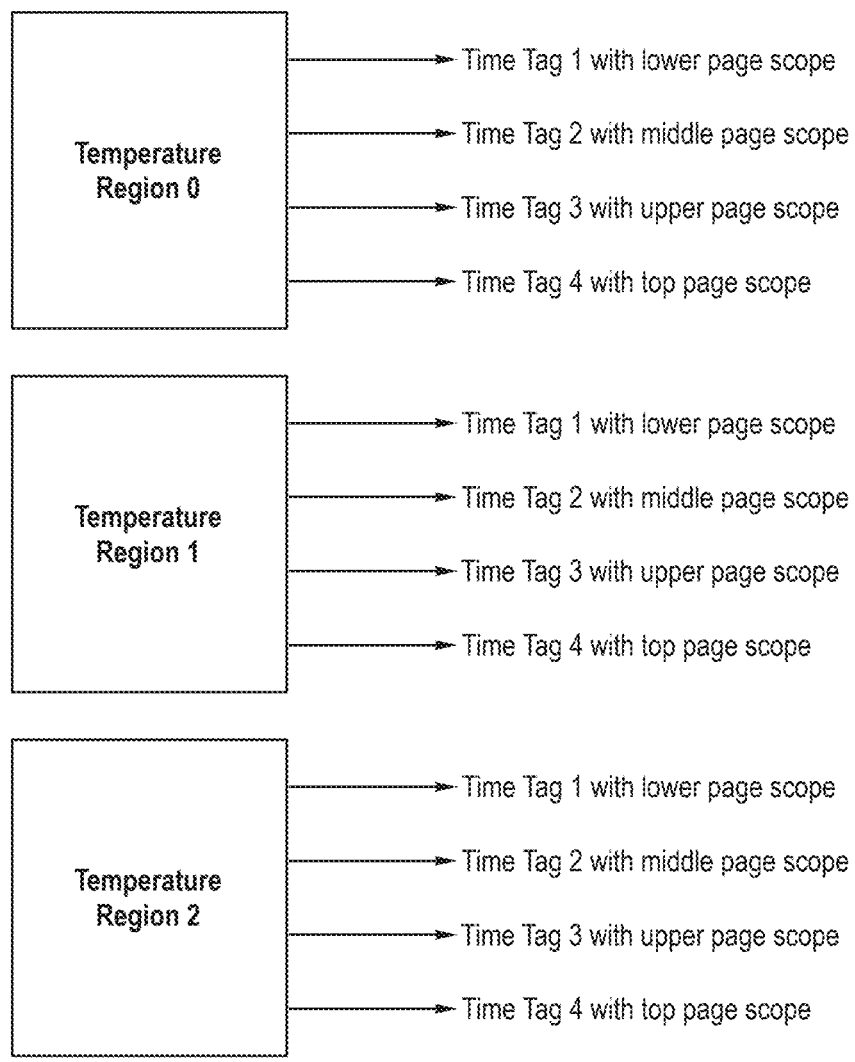
FIG. 15 is an illustration of example time tag allocations of an embodiment.

In one embodiment, the controller 102 can perform active time tag allocation for recently-closed metablocks. Some SSD memories mainly support three temperature regions (cold, room, and hot temperature), and recently-closed metablocks can be assigned to active time tags of the current temperature region. Active time tags in every temperature region can have four time tags with respect to lower, middle, upper, and top pages. FIG. 15 is an illustration of example time tag allocations. In this example, CVD cache entries can be created with die-block-page scope. Each entry of a CVD cache has a scope, and the CVD cache can provide different scopes for the logical page, die wordline, and die wordline logical pages. In one example, the die-block-page scope covers all wordlines of a targeted block on a given logical page, which can cover all planes within a die. This is illustrated in FIG. 14.

This method of maintaining CVD read parameters can be useful when RTDR, EPWR, and read scrub failures happens, as it will be mainly affect upper and top pages and cause an LDPC decode failure. It can be easy to compact the lower or middle pages where the data retention effect is less, and new time tags can be allocated. There are several advantages associated with these embodiments. For example, TRT compaction can be easier when clubbing two TRTs of same logical page, and the amount of space needed in the RAM to maintain TRT read parameters can be reduced by 50%. Also, the module can operate between 0 and 90 C, where the impact of the temperature region in memory is less as compared to a RTDR kind of data retention that happens on a specific page level. Further, LDPC BES operations carried on with respect to a logical page level can be done on one logical page, so it will be easy to get read parameters at a page level. Additionally, the CVD module can easily handle block level failures (not only temperature and data retention issues) and can maintain optimal read parameters (so the performance impact due unoptimized read parameters can be reduced).

In yet another embodiment, the controller 102 can perform a CVD read parameter update based on EPWR and RS read retry CVD shift. There is a need to reduce the overhead of EPWR in the system on all the logical pages (e.g., lower, middle, upper, and top pages in QLC memory). Usually, if any kind of read disturb or failure happens, it will be mainly on the page that is nearer to erase and higher pages like top page.

Figure 19:
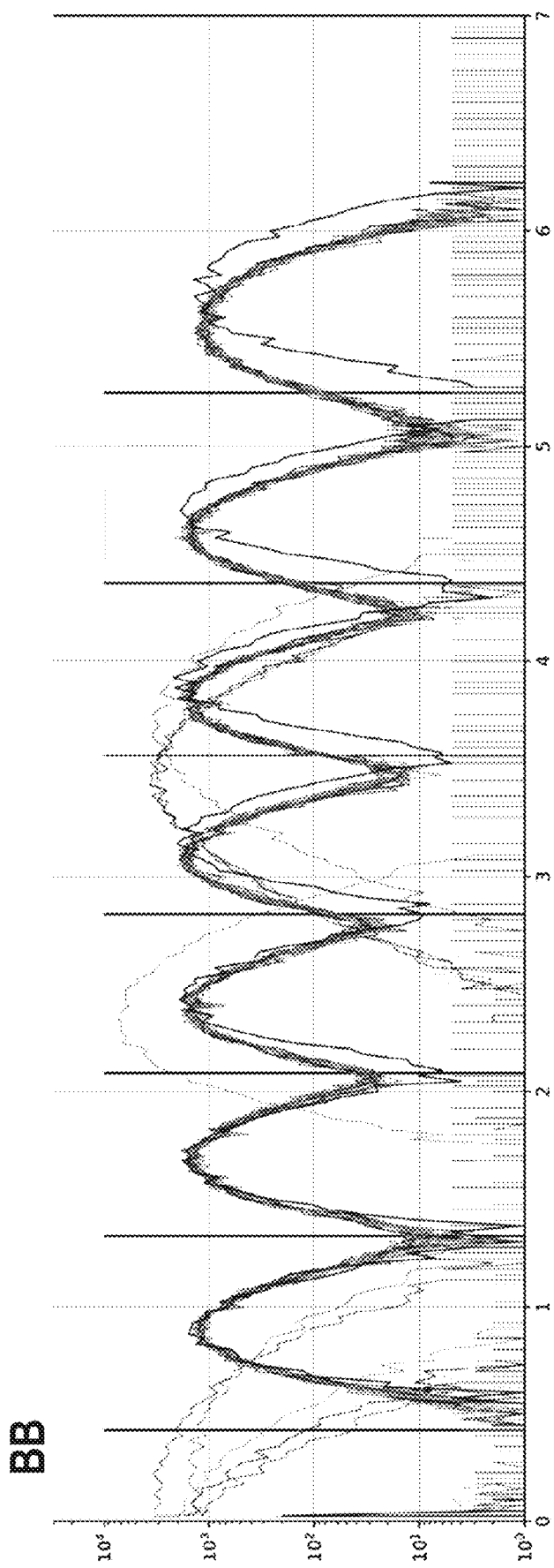
FIG. 19 is a graph of an embodiment illustrating a read disturb issue.

The middle page may be preferred as the EPWR page because the middle page is nearer to the erased state read disturb issues as compared to other pages. Selection of the EPWR page can depend on the LDPC encode format. In case of BICS5 X3 LDPC, the encode format is 1-3-3 where the middle page has a state that is near the erased page. FIG. 18 explains the LDPC encode format of BICS5 X3. In NAND memory, whenever the middle pager is shifted, the upper and top pages may also be shifted. FIG. 19 shows middle and top pages shift due to RTDR and read disturb issues.

A CVD cache can be used to handle the several ECC exceptions by holding an entry per each affected block, wordline, and page level data. The scope means that each cache entry can cover all the CVD read parameters within its scope. The CVD cache entries are defined based on priority. If multiple failures are observed in the same scope, the next high priority scope CVD cache entries are created. FIGS. 20-22 shows various scopes of embodiments.

Figure 23:
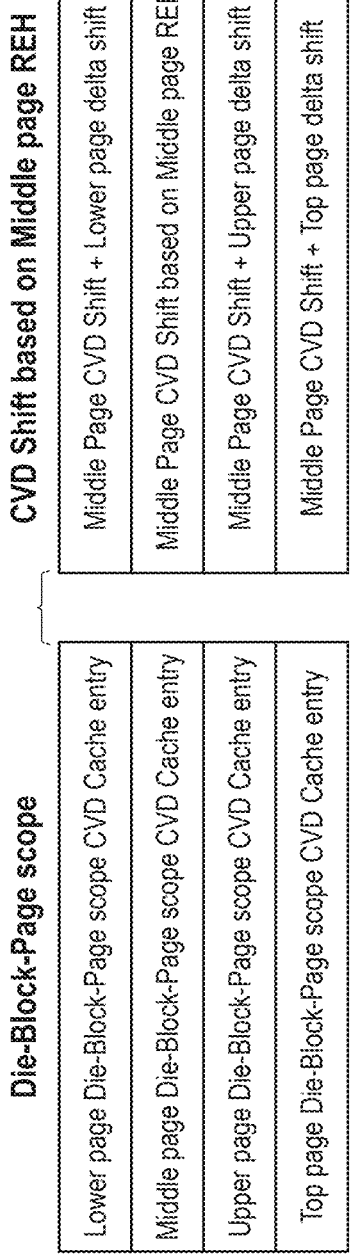
FIG. 23 is an illustration of scopes and shifts of an embodiment.
Figure 24:
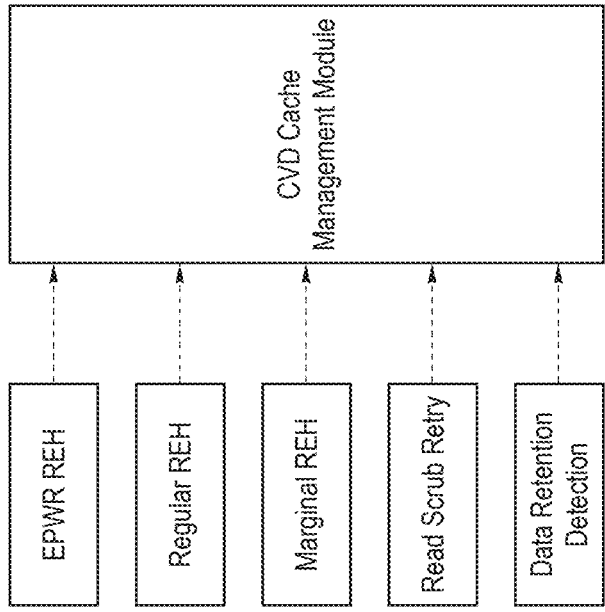
FIG. 24 is an illustration of a cache of an embodiment.

In one embodiment, the controller 102 uses the shift in middle page failure CVD cache entries to extrapolate upper page and top pages CVD cache entries based on respective CVD cache scopes. FIG. 23 explains illustrates this with respect to upper and top pages. These embodiments are based on memory failure type and characteristics, and the amount of CVD shifts can be applied or adjusted on different pages based on the memory failure types from different modules in the firmware. The CVD cache management module can update the CVD cache entries on upper and top pages with respect to read disturb, data retention, and marginal write abort failure types. FIG. 24 is an illustration of one example implementation.

There are several advantages associated with these embodiments. For example, these embodiments can boost performance by maintaining CVD cache read parameters. Also, in case of gaming devices, read parameters can be updated on the wordline level. Further, REH error handling can be minimized, and lot of background operations can avoid. These embodiments may also be desired when the number of logical pages increases because of higher bits per cell memory.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    one or more processors, individually or in combination, configured to:
        group a set of continuous wordlines crossing a data retention threshold together as a band, wherein the set of continuous wordlines are in an open block in the memory;
        determine whether a number of continuous wordlines in the set is greater than a threshold; and
        in response to determining that the number of continuous wordlines in the set is greater than the threshold, classify the set of continuous wordlines as an outlier band in the open block.

2. The data storage device of claim 1, wherein the one or more processors, individually or in combination, are further configured to perform coarse data retention detection on the set of continuous wordlines.

3. The data storage device of claim 2, wherein the one or more processors, individually or in combination, are further configured to perform fine data retention detection on a neighboring wordline in the open block.

4. The data storage device of claim 1, wherein the one or more processors, individually or in combination, are further configured to update read parameters for open blocks in the memory.

5. The data storage device of claim 1, wherein the one or more processors, individually or in combination, are further configured to update active thermal region tags.

6. The data storage device of claim 1, wherein the one or more processors, individually or in combination, are further configured to close data-retention-detected open blocks in the memory.

7. The data storage device of claim 1, wherein the one or more processors, individually or in combination, are further configured to provide cell voltage distribution (CVD) cache management.

8. The data storage device of claim 7, wherein an amount of CVD shift is addressed on different pages based on a memory failure type.

9. The data storage device of claim 8, wherein the memory failure type comprises a regular failure, a marginal failure, an enhanced post-write read failure, or a read scrub failure.

10. The data storage device of claim 1, wherein the threshold comprises five consecutive wordlines.

11. The data storage device of claim 1, wherein memory comprises a plurality of meta dies.

12. The data storage device of claim 1, wherein the memory comprises a three-dimensional memory.

13. In a data storage device comprising a memory, a method comprising:
    grouping a set of continuous wordlines crossing a data retention threshold together as a band, wherein the set of continuous wordlines are in an open block in the memory;
    determining whether a number of continuous wordlines in the set is greater than a threshold; and
    in response to determining that the number of continuous wordlines in the set is greater than the threshold, classifying the set of continuous wordlines as an outlier band in the open block.

14. The method of claim 13, further comprising performing coarse data retention detection on the set of continuous wordlines.

15. The method of claim 13, further comprising performing fine data retention detection on a neighboring wordline in the open block.

16. The method of claim 13, further comprising updating read parameters for open blocks in the memory.

17. The method of claim 13, further comprising updating active thermal region tags.

18. The method of claim 13, further comprising providing cell voltage distribution (CVD) cache management.

19. The method of claim 13, further comprising shifting an amount of cell voltage distribution based on a memory failure type.

20. A data storage device comprising:
    a memory; and
    means for:
        grouping a set of continuous wordlines crossing a data retention threshold together as a band, wherein the set of continuous wordlines are in an open block in the memory;
        determining whether a number of continuous wordlines in the set is greater than a threshold; and
        in response to determining that the number of continuous wordlines in the set is greater than the threshold, classifying the set of continuous wordlines as an outlier band in the open block.

* * * * *